US011265563B2

(12) United States Patent
Parois

(10) Patent No.: US 11,265,563 B2
(45) Date of Patent: Mar. 1, 2022

(54) OPTIMIZATION OF DOWNSAMPLING OCCURRING BEFORE ENCODING IMAGES DURING COMPRESSION

(71) Applicant: ATEME, Velizy Villacoublay (FR)

(72) Inventor: Ronan Parois, Rennes (FR)

(73) Assignee: ATEME, Velizy Villacoublay (FR)

( * ) Notice: Subject to any disclaimer, the term of this patent is extended or adjusted under 35 U.S.C. 154(b) by 0 days.

(21) Appl. No.: 16/599,780

(22) Filed: Oct. 11, 2019

(65) Prior Publication Data
US 2020/0120349 A1  Apr. 16, 2020

(30) Foreign Application Priority Data

Oct. 12, 2018  (FR) .................................. 18 59493

(51) Int. Cl.
H04N 19/117  (2014.01)
H04N 19/132  (2014.01)
(Continued)

(52) U.S. Cl.
CPC .......... H04N 19/33 (2014.11); H04N 19/136 (2014.11); H04N 19/167 (2014.11); H04N 19/80 (2014.11)

(58) Field of Classification Search
CPC .... H04N 19/33; H04N 19/136; H04N 19/167; H04N 19/80; H04N 19/132; H04N 19/14;
(Continued)

(56) References Cited

U.S. PATENT DOCUMENTS 5,319,549 A * 6/1994 Katsuragawa ........ G06T 7/0012
382/108
5,343,390 A * 8/1994 Doi ........................ G16H 50/20
382/132
(Continued)

FOREIGN PATENT DOCUMENTS

WO  WO 1998/015915 A1  4/1998
WO  WO 2007/020230 A2  2/2007
WO  WO 2010/123855 A1  10/2010

OTHER PUBLICATIONS

Preliminary Search Report in priority French Patent Application No. 18 59493, dated Mar. 14, 2019 (9 pages).

*Primary Examiner* — Philip P. Dang
(74) *Attorney, Agent, or Firm* — Faegre Drinker Biddle & Reath LLP

(57) ABSTRACT

The disclosure lies in the field of coding image data, scalable in image resolution, such that one or more successive downsamplings are performed from a source signal of maximal image resolution to a minimal image resolution, in order to encode a base layer (L0) corresponding to this minimal resolution, the base layer (L0) serving as a reference for one or more enhancement layers (L1, L2) to be used for decoding at a terminal having a screen of higher image resolution than the minimal image resolution. From said successive downsamplings, the base layer (L0) and the one or more enhancement layers (L1, L2) are constructed, and then an encoded bit stream is prepared in order to be transmitted, comprising data of the base layer and of the enhancement layer or layers. In particular, the downsampling step comprises the application of an adaptive low-pass filter to the image data from the downsampling.

12 Claims, 3 Drawing Sheets

(51) Int. Cl.
*H04N 19/33* (2014.01)
*H04N 19/136* (2014.01)
*H04N 19/167* (2014.01)
*H04N 19/80* (2014.01)

(58) Field of Classification Search
CPC .... H04N 19/146; H04N 19/17; H04N 19/187; H04N 19/59; H04N 19/85; H04N 19/117
See application file for complete search history.

(56) References Cited

U.S. PATENT DOCUMENTS

| | | | | |
|---|---|---|---|---|
| 7,110,459 | B2 * | 9/2006 | Srinivasan | H04N 19/523 |
| | | | | 375/240.29 |
| 7,609,763 | B2 * | 10/2009 | Mukerjee | H04N 19/56 |
| | | | | 375/240.16 |
| 7,760,960 | B2 * | 7/2010 | Yan | H04N 19/187 |
| | | | | 382/261 |
| 8,107,571 | B2 * | 1/2012 | Sullivan | H03H 17/0294 |
| | | | | 375/350 |
| 8,155,954 | B2 * | 4/2012 | Edler | G10L 25/48 |
| | | | | 704/211 |
| 9,053,562 | B1 * | 6/2015 | Rabin | G06F 16/583 |
| 9,262,670 | B2 * | 2/2016 | Pietila | H04N 19/167 |
| 9,286,537 | B2 * | 3/2016 | Radha Krishna Rao | |
| | | | | G06K 9/4604 |
| 9,351,009 | B2 * | 5/2016 | Deshpande | H04N 19/597 |
| 9,479,685 | B2 * | 10/2016 | Ng | G02B 27/0075 |
| 9,554,149 | B2 * | 1/2017 | Kim | H04N 19/105 |
| 9,924,166 | B2 * | 3/2018 | Ye | H04N 19/186 |
| 10,334,287 | B2 * | 6/2019 | Olechowski | H04N 21/234309 |
| 2007/0160304 | A1 * | 7/2007 | Berkner | G06K 9/36 |
| | | | | 382/240 |
| 2008/0278602 | A1 * | 11/2008 | Otsu | H04N 9/04515 |
| | | | | 348/223.1 |
| 2010/0150229 | A1 | 6/2010 | Francois et al. | |
| 2012/0075436 | A1 * | 3/2012 | Chen | H04N 13/161 |
| | | | | 348/51 |
| 2017/0317938 | A1 * | 11/2017 | Abraham | H04W 52/0219 |

* cited by examiner

OPTIMIZATION OF DOWNSAMPLING OCCURRING BEFORE ENCODING IMAGES DURING COMPRESSION

CROSS-REFERENCE TO RELATED APPLICATIONS

This application claims priority benefit under 35 U.S.C. § 119(d) from French Patent Application No. 18 59493 filed Oct. 12, 2018, the entire content of which is incorporated herein by reference.

TECHNICAL FIELD

The present disclosure relates to the field of video encoding/decoding, particularly during compression. More particularly, the disclosure aims to improve the efficiency of coding based on a scalable extension of a given coding technique.

BACKGROUND

In the HEVC (High Efficiency Video Coding) video coding standard, the extension (SHVC) of this coding technique makes it possible to receive and decode the image data on different terminals having respective screen resolutions, a terminal having a low resolution screen requiring the use of less data for decoding. Thus, a minimal resolution terminal requires only a minimal set of data, this minimal set being called a "base layer", while a higher resolution terminal requires said base layer and one or more other additional layers. The term "scalable" thus means that this type of encoding/decoding supports these different layers (in addition to encoding/decoding during compression).

Such a "scalable" encoding/decoding technique makes it possible to respond to the new trends in video consumption and the resulting constraints. For consumers, these new trends are reflected in the ability to watch video content on terminals that may have very different picture quality (television, laptop, smartphone, tablet). These new constraints that compression and video standards must address relate to coding efficiency, processing speed, and the ability to stream video content over one or more channels. In addition, new image formats are defined in addition to the existing constraints, and consist of an increase in one or more component characteristics of the video, for example the image resolution for UHD (Ultra High Definition) format, the capture and display of images of high dynamic luminance for HRD (High Dynamic Range) format, or the frame rate for HFR (High Frame Rate) format.

These new formats improve the user experience but, in order to satisfy the technical constraints of effective compression and dissemination of video content, scalable video coding remains to be optimized.

More specifically, scalable video coding makes it possible to generate a bit stream from a single video source, containing several formats of this video source. Depending on the type of scalability, spatial or temporal for example, the video will be encoded in the bit stream according to different resolutions or frame rates.

Each generated layer generally corresponds to a video format, and in the case of spatial scalability, it refers to a given resolution. The architecture of scalable coding is defined by the aforementioned base layer, which encodes the lowest resolution. It serves as a reference for the layers encoding higher resolutions, also called "enhancement layers".

These enhancement layers are ranked by ascending order of resolution, starting from the base layer. Each of the enhancement layers may exploit or provide coding information to lower or higher enhancement layers. A layer is said to be "predicted" if it exploits information from another layer. A layer is said to be a "reference layer" if it provides information to another layer. It is thus possible for a predicted layer to exploit the coding of a reference layer. This exploitation is called "inter-layer prediction". It makes it possible to improve coding efficiency in comparison to an equivalent single-layer coding (same resolution and same coding parameter).

The prediction efficiency depends both on the prediction tools themselves and on the quality of the coding information. This coding information passing from one layer to another by conversion must correspond to the destination format. These mechanisms and conversion parameters are defined in the video compression standards.

A method for producing a base layer L0 (intended for a low-resolution terminal screen, such as a smartphone or other type) and enhancement layers L1, L2 (for higher-resolution terminal screens, such as a computer or television screen or other type) is now described in more detail with reference to FIG. 1. This method is usually implemented at a headend.

A conversion of the data of the video source is applied at the headend to the lower layers L0, L1 in order to obtain the desired formats for low resolutions. For spatial scalability, this corresponds to a downsampling DO SAMP.

In the example of scalable video coding (for example according to the scalable extension of the HEVC standard) illustrated in FIG. 1, a bit stream BIN comprising three distinct resolutions (2160p, 1080p, 720p) is obtained as output.

Thus, several interdependent layers are generated from an initial source video signal (uncompressed in step S10).

Here, three layers L0, L1, and L2 (S13, S15, S17) are generated as presented below:

The first two, L0 and L1, are encoded from a succession of downsampling operations (steps S11, S12) performed on the initial uncompressed video signal until the base layer L0 is reached in step S13. These downsampling operations make it possible to bring the initial video resolution (2160p or more generally "ultra high definition") to lower resolutions, here 1080p, then 720p, respectively corresponding to layers L1 and L0. The lowest resolution layer L0 (constructed at the end of step S13) is therefore the base layer. It is therefore used as a reference layer for the higher layers L1 and L2, which are enhancement layers. Layer L1 (step S15) is both an enhancement layer, and a reference layer for layer L2;

After these downsampling operations, starting from the base layer L0, inter-layer predictions are estimated, each by means of an upsampling operation in order to reach a higher resolution level (step S14) for comparison with the source video signal at this same higher resolution, in order to construct an enhancement layer L1 and possibly obtain additional information on motion vectors at this resolution for inter-image coding for example;

This successive upsampling operations (step S16) are then continued with comparisons (S17) with the source signal of the same resolution until the highest resolution layer (L2 in the illustrated example) is reached; this is done starting from the lower layers (L0 and L1) to the next higher layer (L2).

These upsampling operations thus contribute to the construction of the enhancement layers. Each enhancement layer corresponds to the addition of coding information supplementing the information given by the lower layers.

More precisely, the "comparison" with the source images of the same resolution makes use of inter-layer prediction operations to exploit any redundancies in information between the layers. Thus, upsampling is applied in order to compare information on the same resolution. For example, in the case of inter-layer motion prediction, the coordinates of the motion vector field of the (low resolution) reference layer are resized by upsampling so that they can be used by the predicted layer (of higher resolution).

All the data is then sent to a multiplexer (step S18) which outputs a single bit stream (BIN), containing the data L0, L1, L2 for three different resolutions in the illustrated example.

In this manner, during video decoding at high resolution (2160p), a decoder reconstructs the video signal at this resolution from the coding information of layer L2, but also from coding information present in the lower layers corresponding to lower resolutions (1080p and 720p for example). In the case of decoding for a 1080p resolution screen, layer L1 is reconstructed based on the coding information of layer L1 as well as that of layer L0.

Thus, the mechanism of successive downsamplings S11, S12 makes it possible to progressively reduce the image resolution until the image of lowest resolution is reached, which itself will be compressed by encoding (in step S19 of FIG. 1) to form the base layer L0. One can see, from the construction of the upper layers, that a layer L0 of poor quality has an effect on layers of higher level L1, L2.

There is therefore a need to improve the efficiency of inter-layer prediction, and to ensure that the coding information obtained in layer L0 (or any other reference layer) best benefits the predicted levels of higher level.

The present disclosure improves the situation.

DRAWINGS

Other features and advantages of the disclosure will be apparent from reading the following exemplary embodiments and examining the appended drawings in which.

DETAILED DESCRIPTION

Figure 1:
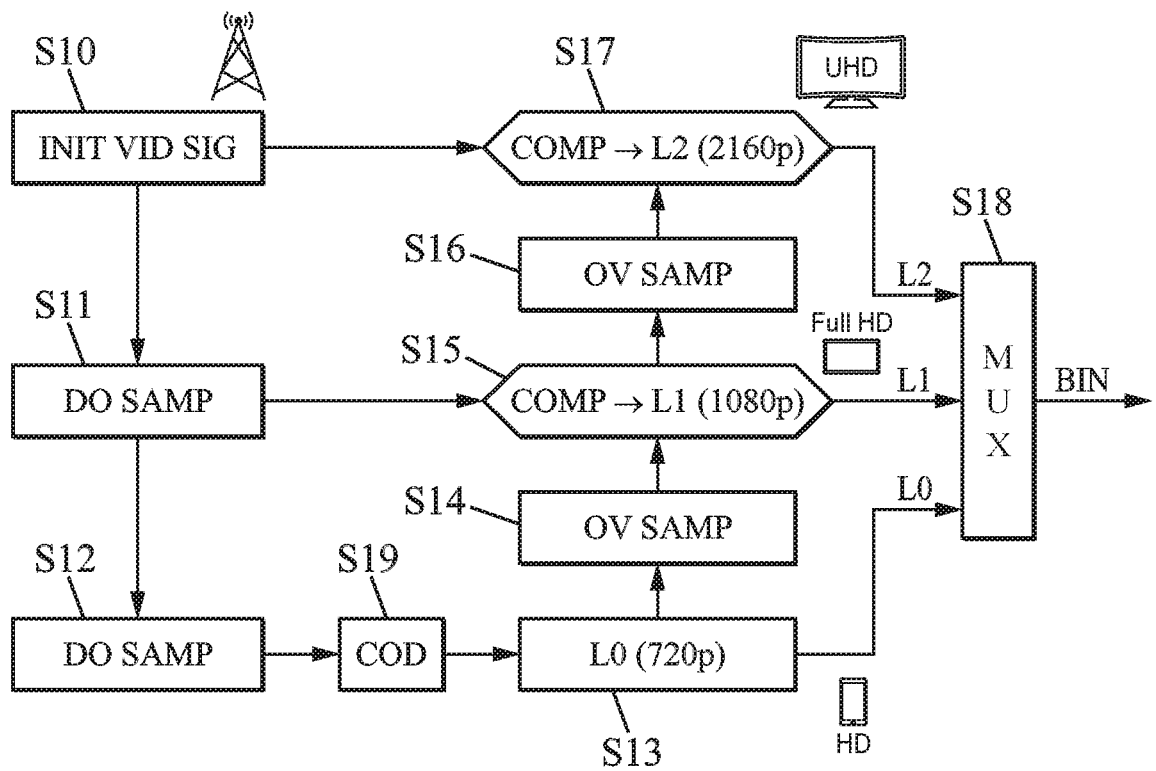
FIG. 1 illustrates a conventional scalable coding.

The present disclosure proposes a method for coding image data, scalable in image resolution, comprising the following steps:

From a source signal of maximal image resolution, performing one or more successive downsamplings to a minimal image resolution, in order to encode a base layer (reference L0 of FIG. 1) corresponding to said minimal resolution, the base layer (L0) serving as a reference for one or more enhancement layers (L1, L2) to be used for decoding at a terminal having a screen of higher image resolution than the minimal image resolution, From said successive downsamplings, constructing the base layer (L0) and the one or more enhancement layers (L1, L2), Preparing an encoded bitstream to be transmitted, comprising data of the base layer and of the one or more enhancement layers.

In particular, the downsampling step comprises the application of an adaptive low-pass filter to the image data from the downsampling, in order to reduce a spectral folding effect.

The quality of layer L0, and therefore of all the layers L1, L2 whose construction depends on it, is thus improved over the prior art.

Of course, the construction of the enhancement layer or layers (L1, L2) is carried out, with respect to the base layer (L0), for layers (L1, L2, etc.) which require a downsampling with respect to the source content. If a terminal directly requests the resolution of the source content, the latter is transmitted to it.

Indeed, the downsampling mechanism makes it possible to progressively reduce the resolution of a video by deleting a portion of the pixels of the images constituting this video. However, such downsampling causes an aliasing phenomenon (or "spectral folding") which is visible in the images as a degradation of the image quality, particularly in areas of contrast. To overcome this aliasing phenomenon, a low-pass filter could be used upstream of the downsampling operation.

The complexity of such a low-pass filter must be sufficiently low in order to make sparing use of the hardware resources needed for the coding process in general, but must be high enough that the inter-layer prediction remains efficient, at least as efficient as other compression processing methods (for example intra-image and inter-image predictions).

Thus, in the context of scalable coding, this downsampling filter must satisfy several constraints. Its complexity must be sufficient to eliminate aliasing, while being compatible with the available hardware resources of the encoder. Next, it must allow optimizing the coding efficiency from a global point of view. The coding efficiency is improved by the use of inter-layer prediction, which itself depends on coding information from the reference layers. Finally, the quality of the coding information from the reference layers depends on the downsampling operation performed on the video source. As the coding of the reference layers is not simply predictable, currently there is no downsampling filter model in existence that allows ensuring optimum coding efficiency for each image or image region.

The disclosure therefore proposes a downsampling filter which in particular is adaptive, and which makes it possible to reach this optimum coding efficiency for each image or image region (according to the "Bjontegaard" metric as will be seen below).

An adaptive filter may be provided which is directly combined with the downsampled signal by convolution, for example a finite impulse response type of filter in one embodiment.

More particularly, this finite impulse response filter may be of a type chosen among at least:
a Kaiser-Bessel window filter,
a bicubic filter,
a bilinear filter,
an interpolation filter,
thus presenting a palette of filter types which are more or less "aggressive" and therefore "smoothing" the image textures to a greater or lesser extent.

An image pre-analysis before downsampling may then be performed in order to select a type of adaptive filter according to one or more predetermined criteria.

In one possible embodiment of such criteria, the type of adaptive filter may be selected for an image or image region according to at least one criterion among:
- image resolution before downsampling,
- frame rate of the source signal,
- coding rate of the images,
- importance to be given to one or more regions of interest in each current image.

Typically, the importance to be given to a region of interest can be quantified by a texture complexity score in that region.

In one possible embodiment, this importance to be given to a region of interest in a current image can be measured by:
- a determination of a depth map in the current image, in order to identify a plurality of superimposed planes,
- in each of the identified planes, a detection and quantification of blur,
- and the assigning of a score to a region according to:
  - a depth of the plane in which this region is located (typically between a foreground and a background), and
  - a sharpness of the image in this plane.

Thus, for sharp foreground regions, a bicubic filter may be selected, while for sharp background regions and/or fuzzy foreground regions, a bilinear filter is used, and otherwise an interpolation filter may be used.

In the context of selecting a Kaiser-Bessel window filter, it is possible to choose the configuration of such a filter within a range of configurations (defining coefficients of the filter), based on a criterion among image resolution before downsampling and frame rate of the source signal.

Finally, the coefficients of the Kaiser-Bessel window filter can be chosen according to a configuration selected within the aforementioned range, based on the other criterion among image resolution before downsampling and frame rate of the source signal.

Additionally or alternatively, a bicubic filter may be selected if the coding rate of the base layer is greater than a threshold, and otherwise a bilinear filter is selected.

For example, such a threshold may be 2 Mbits/sec.

The present disclosure also relates to a computer program comprising instructions for implementing the above method, when these instructions are executed by a processor of a processing circuit. An algorithm of such a computer program can be illustrated typically by FIGS. 2A, 2B and 3, discussed below.

Figure 4:
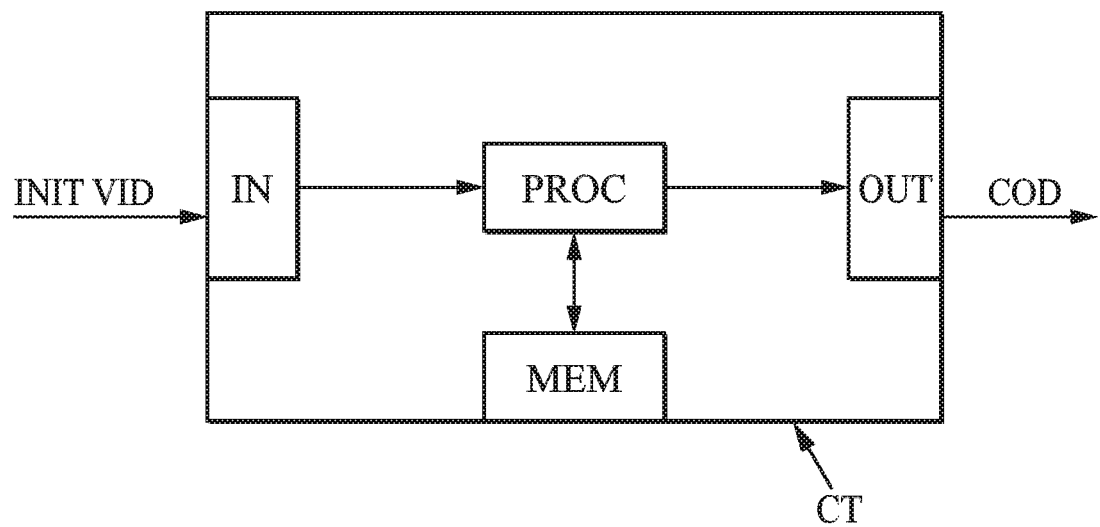

The present disclosure also relates to at an image data coding device, scalable in image resolution, comprising a processing circuit for implementing the above method. With reference to FIG. 4, such a processing circuit CT may typically comprise:
- An input IN to receive the initial image data of the source signal,
- A memory MEM for at least temporarily storing said data, and more particularly instructions of a computer program within the meaning of the disclosure, as well as filter data (types of filters and sets of appropriate coefficients, for example),
- A processor PROC for processing the image data in order to pre-analyze the images and select at least one type of filter on the basis of this pre-analysis (or several types for several regions in a same image), with a set of associated coefficients, which are appropriate for the image or the image region. For this purpose, the processor PROC is arranged to cooperate with the memory MEM, in particular in order to read the instructions of the computer program and execute them,
- And an output OUT for delivering image data downsampled and filtered by the filter thus selected and constructed, these data then able to be encoded (as illustrated in steps S19, S15 and S17 presented above with reference to FIG. 1).

Figure 2A:
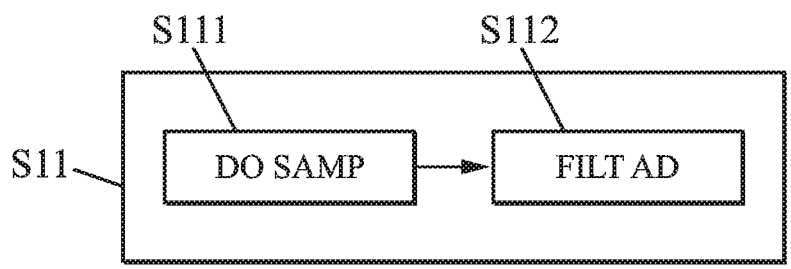
FIGS. 2A and 2B show aliasing noise filtering combined with a downsampling operation, for illustrative purposes only.
Figure 2B:
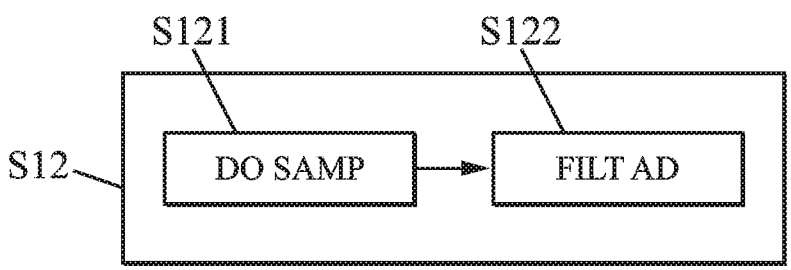

The present disclosure lies within a context of an encoding method of the type illustrated in FIG. 1. In particular, during the successive downsampling steps S11, S12, in order to reduce the noise from spectral folding (or "aliasing"), adaptive filtering is applied (typically a low-pass filter to reduce the aliasing) in respective steps S112 and S122 which follow steps S111 and S121 of downsampling to lower resolutions, as illustrated in FIGS. 2A and 2B for example. Of course, the three ellipsis dots under the title of FIG. 2B indicate that further downsampling, followed by further adaptive filtering, may be provided (and thus in the other FIGS. 2C, 2D, etc.) for a diversity of more than three resolutions.

The parameters, particularly of the adaptive filters (or the types of filters used) may be different from one downsampling to another, as described below.

In one particular embodiment, for each image or image region, the choice of the type of filter and the coefficients of the filter of the chosen type is made based on criteria related to the content of the source or to the coding itself. For example, these filter selection criteria may be:
- the initial image resolution (before the downsampling S11 or S12 of FIG. 1, requiring the filtering for which the filter is to be chosen), or the image "format" below,
- the number of frames per second in the source signal (or "frame rate" below),
- the coding rate of the images to be transmitted (in step S19 of FIG. 1),
- the importance to be given to one or more regions of interest in the image, a texture complexity for example possibly quantifying this importance (and more particularly the complexity related to encoding this texture).

The filter type may be a finite impulse response filter, selected from:
- a Kaiser-Bessel window filter,
- a bilinear filter,
- a bicubic filter,
- or an interpolation filter with one or more nearest neighbors.

The indication in this description that "the filter is applied after downsampling the signal" is a misuse of language. In reality, a finite impulse response filter corresponds to convolution of an input signal sampled by the impulse response of the filter, outputting a downsampled and filtered signal. Thus, in the present description, it is possible to talk about a "downsampling filter".

The coefficients of the filter can be chosen according to the different possible parameters of the signal to be filtered. For example, in the case of using a Kaiser-Bessel window filter, the choice of coefficients can depend on a parameter such as the image resolution before downsampling and/or the frame rate of the source.

For example, one can refer to Table 1 below, where the values marked with an asterisk indicate the optimal choices of sets of Kaiser-Bessel K-i coefficients according to the resolution and the frame rate (the difference between situations A1 and A2 or between situations B1 and B2 or B3 and B4) being related to the type of scene represented in the image (face, landscape, or other).

These optimal choices minimize the percentage (negative) presented in Table 1, this percentage quantifying the optimization of the in fine coding efficiency according to the "Bjontegaard" metric.

TABLE 1

| Resolution | Initial | K-1 | K-1.25 | K-1.5 | K-1.75 | K-2 | K-2.25 | K-2.5 |
|---|---|---|---|---|---|---|---|---|
| UHD1 (3840 × 2160, 30 fps) | −26.9% | −25.4% | −26.2% | −26.8% | −27.3% | −27.6% | −27.7%* | −27.7%* |
| A1 (2560 × 1600, 30 fps) | −24.9% | −24.6% | −25.1% | −25.6% | −25.9% | −26.0% | −26.1%* | −25.9% |
| A2 (2560 × 1600, 30 fps) | −27.4% | −24.8% | −25.7% | −26.4% | −27.0% | −27.4% | −27.6%* | −27.6%* |
| B1 (1920 × 1080, 24 fps) | −29.6% | −29.0% | −29.3% | −29.5% | −29.6%* | −29.6%* | −29.6%* | −29.5% |
| B2 (1920 × 1080, 24 fps) | −21.9% | −23.2% | −23.6% | −23.8% | −23.9%* | −23.8% | −23.7% | −23.5% |
| B3 (1920 × 1080, 50 fps) | −19.5% | −19.8% | −20.1% | −20.3% | −20.4% | −20.5%* | −20.4% | −20.2% |
| B4 (1920 × 1080, 50 fps) | −16.3% | −15.8% | −16.0% | −16.2% | −16.4%* | −16.4%* | −16.4%* | −16.3% |
| B5 (1920 × 1080, 60 fps) | −12.3% | −12.9% | −13.2% | −13.5% | −13.6% | −13.7%* | −13.7%* | −13.5% |
| Average | −21.7% | −21.4% | −21.9% | −22.2% | −22.4% | −22.5%* | −22.4% | −22.4% |

For example, for a resolution of 1920×1080 pixels, and with a frequency of 24 frames per second (B1 or B2 above), one can choose as default the Kaiser-Bessel K-1.75 configuration for any type of scene in the image. On the other hand, for the same resolution of 1920×1080 pixels but with a higher frequency (50 or 60 frames per second: B3 to B5), one can choose as default the K-2 configuration.

For a resolution greater than 1920×1080 pixels (for example A1, A2 or UHD), a K-2.25 or K2.5 configuration can instead be chosen.

Figure 3:
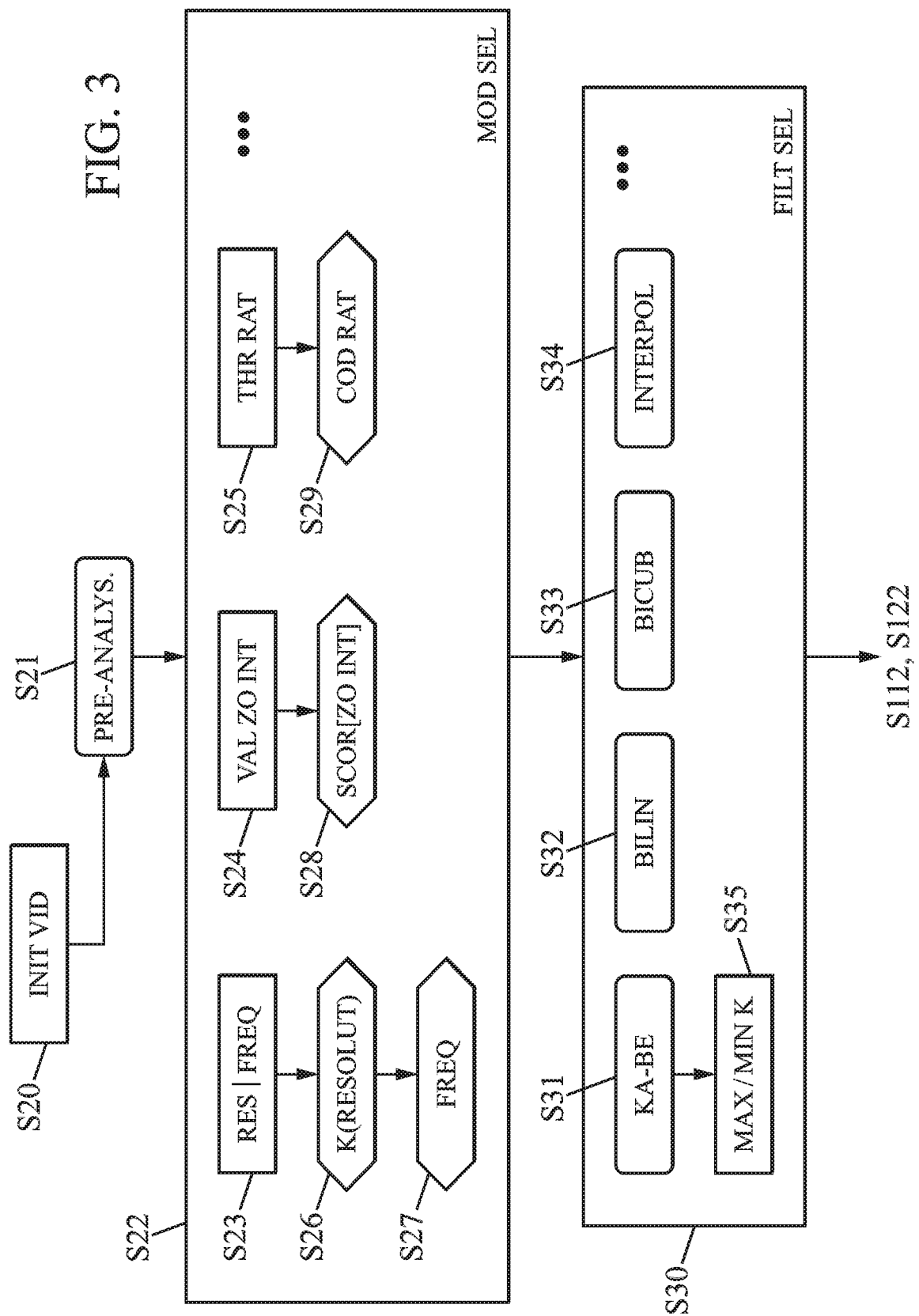
FIG. 3 illustrates an example of selecting a type of filter among a set of filters and possible filter coefficients, according to criteria identified in the images to be processed, FIG. 4 schematically illustrates a device within the meaning of the disclosure.

Reference is now made to FIG. 3 for the following description of selecting one or more filters from a set of types of finite impulse response filters, to be applied to the filtering steps S112, S122 presented above.

The initial image data stream S20 is pre-analyzed in step S21 to typically determine:
- an initial frame rate,
- the resolution before downsampling,
- possibly a type of scene in the image, in particular with information quantifying the importance of one or more areas in the image, quantitatively determining the importance of an image area for example according to the texture complexity of this area.

Information about the coding rate of the images may also be useful. Indeed, the higher the rate the more information from the source image must be retained after filtering S112, S122.

This information from the pre-analysis S21 can then be used for selecting the filter (or combination of filters) in general step S30, according to estimations carried out in general step S22 and based on the aforementioned criteria: frequency, resolution, score of the areas of interest in a current image, coding rate.

One of the selection criteria may be a resolution/frame rate in a context of using a Kaiser-Bessel filter. In step S23, information on the resolution before downsampling is obtained and it is thus possible to select in step S26 a configuration between K-1.75 and K-2. Then, in the above-mentioned step S23, it is possible to obtain data on the frame rate (for example 24 fps) and then definitively choose K-1.75 in step S27. Otherwise (for example with a 50 fps frame rate), K-2 is instead chosen in step S27.

Additionally or alternatively, one can choose a different configuration dynamically, according to the scene and its complexity. Also alternatively, one can choose yet another different type of filter (for example bicubic or bilinear or other) according to the complexity of the image and typically according to a score of the areas of interest in the image in step S28. These areas of interest can be identified in the image as described below (with a score based on the sharpness and the foreground or background position of the area), or predefined according to given location blocks in the image.

For example, in the pre-analysis step S21, it is possible to identify areas of the image having a contrast or texture complexity above or below a threshold in step S24 (for example a face in focus in the foreground, or conversely a uniform sky in the background) and assign a complexity score to each of these areas in step S28.

More particularly, it is possible to measure an interest of an area prior to encoding and filtering, according to two processing steps:
- first establishing a depth map,
- and, in each of the identified planes, it is then possible to detect and quantify blur.

Scores can then be given to each region of interest based on their category, for example:
- 0: Region sharp and in the foreground,
- 1: Region somewhat distant and sharp,
- 2: Region in the background and sharp,
- 3: Region in the foreground and fuzzy,
- 4: Region somewhat distant and fuzzy,
- 5: Region in the background and fuzzy.

Different types of filters can be used for each of these scores. The somewhat distant regions are all regions between the foreground and the background. Regions with a score less than or equal to 1 can be processed by a bicubic filter, those with a score comprised between 2 and 3 can be processed by a bilinear filter, and finally those with a score greater than or equal to 4 by an interpolation filter. For regions with low scores (and therefore of strong interest), the coding efficiency is then improved in comparison to processing which only uses one downsampling filter on the reference layers.

Thus, in such an exemplary embodiment, it is then possible to select in step S30 a filter to be applied to each image area according to its score determined in step S28. For example, a region with a score less than or equal to 1 can be processed with a bicubic filter in step S33. A region with a score comprised between 2 and 3 can be filtered with a bilinear filter in step S32. A region with a score greater than or equal to 4 can be processed with an interpolation filter in step S34.

Additionally or alternatively, it is possible to apply yet another criterion for the choice of filter type (in areas of complementary images for example) as a function of the coding rate of the reference layers (L0 or L1). In step S29, the current value of the coding rate can be compared to a predefined threshold in step S25. For example, when the coding rate exceeds a threshold of 2 Mbits/sec in step S29, a bicubic filter S33 can be used. Conversely, when the coding rate is less than or equal to 2 Mbits/sec S29, a bilinear filter can be selected in step S32.

According to another example, it may be useful, when the coding rate varies, to set the predefined threshold according to a percentage of the coding rate assigned either to the layer on which the filter is applied or to all the layers.

Of course, we can combine the different types of filters that are applied from one image to another and we can choose a different filter:
    from one image to another in a succession of images, or
    from one image to be encoded for a layer Li to another image to be encoded for another layer Lj,
    or within a same image, from one region of the image to another region of the image.

More generally, the present disclosure is not limited to the embodiments described above as examples; it extends to other variants.

Thus, for example, it is possible to use filters other than finite impulse response type filters, the main criterion being that they are of the low-pass type in order to "smooth the textures" and thus effectively filter the aliasing noise.

The invention claimed is:

1. A method for coding image data, scalable in image resolution, comprising:
performing, based on a source signal of maximal image resolution, one or more successive downsamplings to a minimal image resolution, in order to encode a base layer corresponding to said minimal resolution, wherein the base layer is usable as a reference for one or more enhancement layers to be used for decoding at a terminal having a screen of higher image resolution than the minimal image resolution,
constructing the base layer and the one or more enhancement layers based on the one or more successive downsamplings,
preparing an encoded bitstream to be transmitted, wherein the encoded bitstream comprises data of the base layer and data of the one or more enhancement layers,
wherein at least one of the one or more successive downsamplings comprises:
performing an image pre-analysis to determine at least an importance criterion to be given to one or more regions of interest in image data of the source signal, the importance criterion being a texture complexity score of a region of interest measured by:
a determination of a depth map in the current image, in order to identify a plurality of superimposed planes, and in each of the identified planes, a detection and a quantification of blur,
assigning of a score to a region according to a depth of a plane in which this region is located, and a sharpness of an image in this plane,
selecting at least one of a plurality of predetermined types of adaptive filters based at least in part upon the determined importance criterion,
applying an adaptive low-pass filter of the selected type to the image data of the source signal to reduce a spectral folding effect of the at least one of the one or more successive downsamplings.

2. The method according to claim 1, wherein the adaptive filter is of a finite impulse response type.

3. The method according to claim 2, wherein the finite impulse response filter is of a type chosen among at least:
a Kaiser-Bessel window filter,
a bicubic filter,
a bilinear filter,
an interpolation filter.

4. The method according to claim 1, wherein the type of adaptive filter is selected for an image or an image region according to at least one criterion among:
an image resolution before downsampling,
a frame rate of the source signal,
an image coding rate.

5. The method according to claim 1, wherein a bicubic filter is selected for sharp foreground regions, while a bilinear filter is used for sharp background regions and/or fuzzy foreground regions, and otherwise an interpolation filter is used.

6. The method according to claim 1, wherein a range of configurations defining coefficients of a Kaiser-Bessel window filter is chosen based on a criterion among an image resolution before downsampling and a frame rate of the source signal.

7. The method according to claim 6, wherein the coefficients of the Kaiser-Bessel window filter are chosen according to a configuration selected within said range, based on other criterion among the image resolution before downsampling and the frame rate of the source signal.

8. The method according to claim 1, wherein a bicubic filter is selected if a coding rate of the base layer is greater than a threshold, and otherwise a bilinear filter is selected.

9. The method according to claim 8, wherein the threshold is 2 Mbits/sec.

10. An image data coding device, scalable in image resolution, comprising a processing circuit for implementing the method according to claim 1.

11. A computer program comprising instructions stored on a non-transitory computer-readable medium for implementing the method according to claim 1, when said instructions are executed by a processor of the processing circuit.

12. A method for coding image data, scalable in image resolution, comprising:
performing, based on a source signal of maximal image resolution, one or more successive downsamplings to a minimal image resolution, in order to encode a base layer corresponding to said minimal resolution, wherein the base layer is usable as a reference for one or more enhancement layers to be used for decoding at a terminal having a screen of higher image resolution than the minimal image resolution, constructing the base layer and the one or more enhancement layers based on the one or more successive downsamplings, preparing an encoded bitstream to be transmitted, wherein the encoded bitstream comprises data of the base layer and data of the one or more enhancement layers, wherein at least one of the one or more successive downsamplings comprises: performing an image pre-analysis to determine at least an importance criterion to be given to one or more regions of interest in image data of the source signal, the image pre-analysis identifying areas in the image data having a contrast or texture complexity above or below a predetermined threshold, the importance criterion being a texture complexity score of a region of interest measured by:

a determination of a depth map in the current image, in order to identify a plurality of superimposed planes, and in each of the identified planes, a detection and a quantification of blur, assigning of a score to a region according to a depth of a plane in which this region is located, and a sharpness of an image in this plane, selecting at least one of a plurality of predetermined types of adaptive filters based at least in part upon the determined importance criterion, applying an adaptive low-pass filter of the selected type to the image data of the source signal to reduce a spectral folding effect of the at least one of the one or more successive downsamplings.

\* \* \* \* \*